United States Patent

Yockey

[11] Patent Number: 5,233,246
[45] Date of Patent: Aug. 3, 1993

[54] INSERT MOLDED TERMINAL FOR ALTERNATOR

[75] Inventor: Steven J. Yockey, Farmington Hills, Mich.

[73] Assignee: Ford Motor Company, Dearborn, Mich.

[21] Appl. No.: 928,570

[22] Filed: Aug. 13, 1992

[51] Int. Cl.$^5$ .................................. H02K 11/00
[52] U.S. Cl. ............................. 310/71; 310/68 D
[58] Field of Search ............... 310/71, 64, 68 D, 43, 310/68 R, 42, 91

[56] References Cited

U.S. PATENT DOCUMENTS

| | | | |
|---|---|---|---|
| 3,870,944 | 3/1975 | Ogawa et al. | 310/68 D |
| 4,065,686 | 12/1977 | Moore | 310/68 D |
| 4,100,440 | 7/1978 | Binder et al. | 310/89 |
| 4,189,653 | 2/1980 | Hiratuka et al. | 310/68 D |
| 4,712,029 | 12/1987 | Nold | 310/71 |
| 4,835,427 | 5/1989 | Bohm et al. | 310/71 |
| 4,841,182 | 6/1989 | Tsuchiya et al. | 310/68 D |
| 4,843,267 | 6/1989 | Kaneyuki | 310/68 |
| 4,926,078 | 5/1990 | Isozumi et al. | 310/71 |
| 5,043,614 | 8/1991 | Yockey | 310/68 D |

Primary Examiner—Emanuel T. Voeltz
Assistant Examiner—Matthew Nguyen
Attorney, Agent, or Firm—Roger L. May; Paul K. Godwin, Jr.

[57] ABSTRACT

An improved terminal for electrical connection to an alternator includes a connecting plate formed as portion of a radiator plate including recesses adapted to receive diodes for use in forming a rectifier bridge. The rectifier bridge assembly comprises a plastic housing that is insert molded over the radiator plate including louvers for passing cooling air past the diodes. The connector plate includes an opening to receive the stem of an enlarged headed fastener before the plastic body is formed around the radiator plate. Before molding, the bolt is pressed by a mold insert against the contact plate so the stem extends outwardly within an axially extending, circumferentially interrupted wall formed by the molding process. The outer surface of the connecting plate includes an axially raised surface at the periphery of the opening and an adjacent tapered surface so that a mold insert pressed against the connecting plate keeps it free of plastic during the molding process, and any overruns of molding material against the tapered surface remain retracted from the axially extended contact surface.

18 Claims, 1 Drawing Sheet

INSERT MOLDED TERMINAL FOR ALTERNATOR

FIELD OF THE INVENTION

The present invention relates generally to the field of alternators as used, for example, to supply DC electrical power to motor vehicles and, more particularly, to an improved alternator rectifier bridge assembly with improved electrical output terminals and a method of making the improved assembly.

BACKGROUND ART

A three-phase alternator rectifier bridge, such as used in a motor vehicle alternator, comprises three "negative" diodes having their anodes connected to a ground terminal and three "positive" diodes having their cathodes connected to a voltage output terminal. Each of the cathodes of the negative diodes are connected to one of the anodes of the three positive diodes and to one of three stator windings of an alternator. The diodes used to form rectifier bridge circuits have been packaged together as a unit which preferably is mounted within the housing of the alternator. For example, U.S. Pat. No. 3,184,625 describes a technique for mounting diodes on metal plates within the housing of an alternator but requiring numerous wire-to-wire solder connections to interconnect the diodes in the rectifier unit.

A problem created and addressed in known prior art rectifier bridge circuits is the dissipation of heat which is generated by the conduction of substantial currents through the diodes of the bridge circuits. U.S. Pat. Nos. 3,539,850, 3,925,809, 3,959,676, 4,218,694, 4,307,437, 4,321,664, 4,538,169, 4,799,309 and 4,835,427 all show various techniques for packaging diodes in a manner that will facilitate heat dissipation.

My previous U.S. Pat. No. 5,043,614, discloses a method and structure for assembling an alternator rectifier bridge incorporated into an alternator housing. Half of the diodes of the rectifier bridge are inserted into apertures formed into an alternator housing end plate such that the end plate serves as one output for the alternator and also as a massive heat sink to dissipate heat generated in the diodes. Typically, the diodes inserted into the end plate are negative diodes with their anode electrodes being inserted and their cathode electrodes extending beyond the end plate. The other half of the diodes of the rectifier bridge are inserted into apertures formed in a radiator plate. Typically, the diodes inserted into the radiator plate are positive diodes with their cathode electrodes being inserted and their anode electrodes extending beyond the radiator plate. The radiator plate is embedded into a plastic circuit member together with conductor members which serve to interconnect electrodes of the diodes and connect the diodes to stator windings of the alternator. The conductor members also provide other electrical connections required for efficient manufacture and proper operation of the alternator.

Although the patented radiator plate has improved heat dissipation abilities over previously known multiple component bridge circuit assemblies, the terminals formed with the radiator plate for connection as an output terminal to a conductor were formed as spade terminals. However, the connection between the fork-shaped female terminal which dovetails with the spade-shaped male terminal has limited current carrying capability. Moreover, modern vehicles have more load circuits, and alternators are accordingly built to produce substantially higher currents. Furthermore, the clamping force of the female member must be limited to allow insertion of the spade shaped male terminal. Any looseness in the connection increases the resistance of the terminal, and in view of the high current flowing from the alternator, substantially increases the heat generated at the coupling. Moreover, the more heat generated at the coupling, the higher the resistance of the connection. As a result, an ever increasing cycle or runaway of increasing heat and resistance can adversely affect the electrical system and the coupling.

Previously known couplings which provide a secure connection between mating parts often employed a threaded fastener specially constructed for mounting and threadably engaging electrical terminals against each other. However, while such a fastener carries higher clamp loads, and therefore can carry higher currents, such structures are difficult to manufacture, install and assemble, and can employ numerous component parts such as insulating shells and machined supports. One previously known connection included a bolt extending through a plastic insulating sleeve inserted through an alternator housing portion. A first nut tightened against the end of the sleeve supported the harness eyelet for engagement by a second nut threadedly engaged on the bolt against the eyelet and the first nut. However, the effect of changing temperature, aging and environmental conditions on the different materials could cause loosening of the electrical connection as the nuts separated.

Another previously known alternator construction with end plates supporting a rectifier bridge assembly required a specially constructed bolt mounted for contact with the positive diode plate by a knurled peripheral portion in wedging engagement to the plate, and a threaded portion for threadably engaging a nut. In addition, a threaded boss area extended through an insulating housing to engage a boss with a flared flange retaining a washer on the boss. The boss was threadably engaged with the bolt once the knurled portion had been embedded in the rectifier assembly to provide a flat surface against which terminals and a nut could be tightly engaged to complete a secure connection for output from the alternator. However, the manufacturing and assembly difficulties render the alternator construction very expensive. Since other previously known bolt and nut connections, may not be efficient conductors. Previous practice required the bolt to be fabricated of more expensive material with better conductivity, such as a copper stud, which is required to be larger for strength. Furthermore, the loose connection problems discussed above could be encountered with such a structure.

SUMMARY OF THE PRESENT INVENTION

The present invention overcomes the abovementioned disadvantages by providing a simplied rectifier bridge construction in which a radiator plate includes an output terminal for the alternator that provides secure threaded engagement of conductors directly to each other. In general, the radiator plate includes a connecting plate portion having an opening adapted to receive the stem of a fastener. Preferably, a plastic circuit member adapted to be secured to the end plate is insert molded about the radiator plate in the manner taught in U.S. Pat. No. 5,043,614, incorporated by reference herein. The connecting plate portion is preferably bent to a position perpendicular to the radially extending arms of the radiator plate so that the axis of the opening lies on a plane parallel to the radially extending arms. A fastener is then inserted through the opening, preferably, the radiator plate is inserted in a mold. As the mold is closed, a mold insert fixes the position of the fastener against the connector plate, and another mold part rests against the opposite side of the connecting plate to prevent the mold material from covering the exposed surface of the connector plate adjacent the threaded stem of the fastener.

As a result, the present invention provides a more secure electrical connection for conductors used to output electrical signals generated by the alternator. In addition, the invention provides an electrical connector which is substantially easier to manufacture and assemble than previously known secure connectors by utilitizing the molded plastic body as a support for the fastener and to form an insulating body around the fastener. Furthermore, the connecting plate portion of the radiator plate may be engaged directly against a harness eyelet between the nut and the enlarged fastener head, whereby the fastener need not be used as a conductor.

BRIEF DESCRIPTION OF DRAWING

The present invention will be more clearly understood by reference to the following detailed description when read in conjunction with the accompanying drawing in which like reference characters refer to like parts throughout the views and in which.

DETAILED DESCRIPTION

Figure 1:
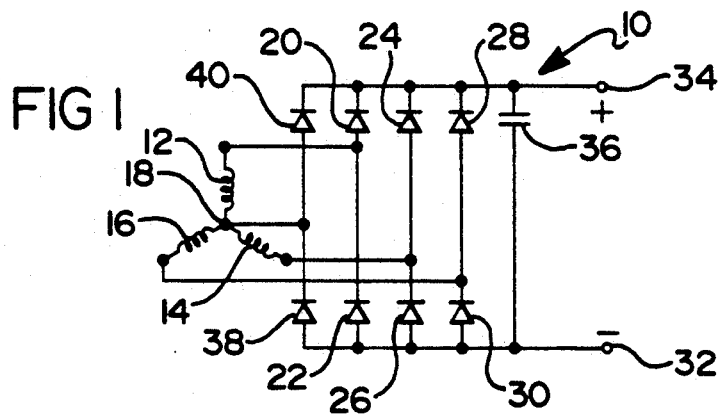
FIG. 1 is a schematic diagram of the electrical circuit of an alternator rectifier bridge circuit.

Referring first to FIG. 1, a typical alternator bridge circuit 10 connected to stator windings 12, 14, 16 of an alternator. The bridge circuit 10 may be used with any type of alternator, but is particularly applicable to three-phase alternators used for electrical power systems in motor vehicles. Typically, motor vehicle alternators include aluminum housings and are positioned adjacent the vehicle's engine in the engine compartment.

The stator windings 12, 14, 16 are interconnected at a neutral node 18 into a wye configuration. The other end of winding 12 is connected to the anode electrode of a diode 20 and the cathode electrode of a diode 22. The other end of winding 14 is connected to the anode electrode of a diode 24 and the cathode electrode of diode 26. The other end of winding 26 is connected to the anode electrode of a diode 28 and the cathode electrode of a diode 30. The diodes 22, 26 and 30 have their anode electrodes connected to a negative output terminal 32 and are usually referred to as "negative" diodes. The diodes 20, 24 and 28 have their cathode electrodes connected to a positive output terminal 34 and are usually referred to as "positive" diodes. The negative output terminal 32 is at a lower voltage than the positive output terminal terminal 34 and is typically connected to the alternator housing which is at ground potential.

Oftentimes, a capacitor 36 is coupled between the output terminals 32 and 34 for noise suppression, for example, to prevent interference with the reception of a radio within a motor vehicle. An additional pair of diodes 38 and 40 having their cathode electrode and anode electrode, respectively, connected to the neutral node 18 of the windings, and their anode electrode and cathode electrode, connected to output terminals 32 and 34 respectively, may be included for additional current output at high operating speeds.

Figure 2:
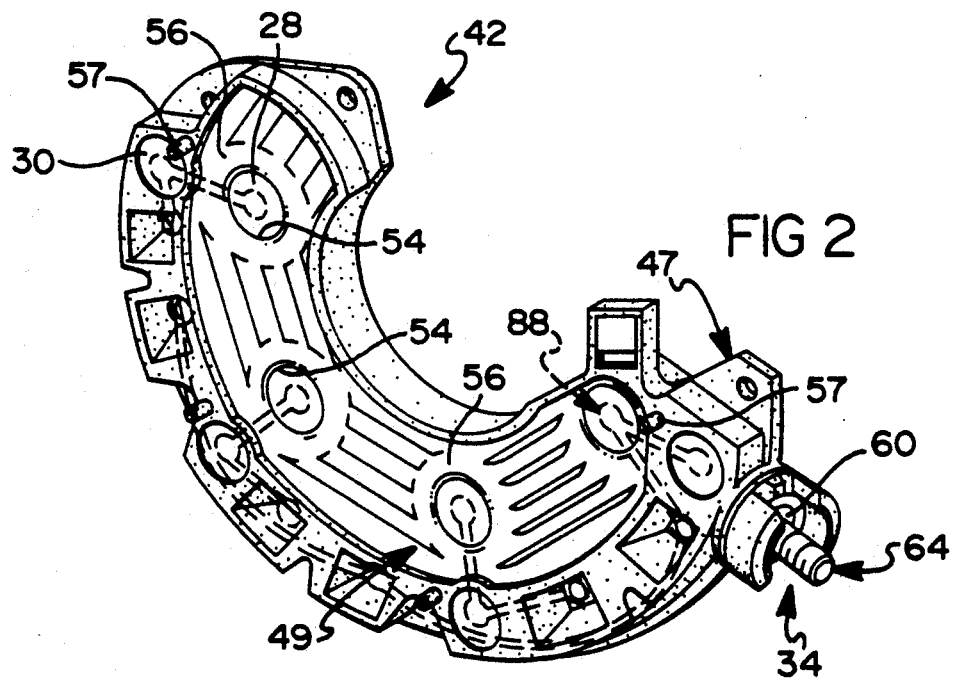
FIG. 2 is a perspective view of a portion of an alternator rectifier bridge construction in accordance with the present invention.

Referring now to FIG. 2, the rectifier bridge assembly 42 including an improved terminal according to the present invention, is shown for carrying the circuit 10. The bridge assembly 42 comprises a plurality of positive diodes 20, 24, 28, 40, only one of which is shown in FIG. 2, with each positive diode having first, anode electrode, and an opposite, cathode electrode. A plurality of negative diodes 22, 26, 30, 38, is also included again with only one being shown in FIG. 2, with each negative diode having a first, anode electrode and an opposite, cathode electrode.

A plastic circuit member 47 is substantially as shown and described in U.S. Pat. No. 5,043,614, incorporated herein by reference. The plastic member 47 is adapted to be secured to an end plate 44 (not shown), carries a generally crescent-shaped radiator plate 49, and first electrical circuit means comprising a plurality of conductor members embedded therein and electrically insulated from one another by the plastic of the plastic circuit member 47. Embedded conductors effecting the connections shown in FIG. 1 are generally designated at 88.

The radiator plate 49 has apertures 54 formed in radially extending portions 56 thereof for receiving the cathode electrodes, represented by the cathode electrode 28C in FIG. 2, of the positive diodes 20, 24, 28, 40 with the anode electrodes, represented by the anode electrode 28A, extending beyond the radiator plate 49. The radially extending portions 56 are generally aligned with the arms of the plastic circuit member 47. The plastic member 47 is secured to the end plate (not shown) and includes passage means comprising semicircular indentations for passing cathode electrodes, of the negative diodes 22, 26, 30, 38. While a variety of devices including rivets may be used to secure the plastic circuit member 47 to the end plate, preferably the plastic circuit member 47 includes plastic extensions 57 which are extended through corresponding openings and heat staked. The radially extending portions 56 are also separated from one another by airflow means comprising louvers 58 in the illustrated embodiment for passing cooling air through the positive radiator plate 49.

The conductor member 88 connects anode/cathode electrodes of pairs of the diodes 20, 22; 24, 26; 28, 40 to the stator windings 12, 14, 16 of the alternator after the plastic circuit member 47 is secured to the alternator housing end plate.

The radiator plate 49 includes a first output of the alternator corresponding to the positive output terminal 34, and the alternator housing end plate defines a second output of the alternator corresponding to the negative output terminal 32. The radiator plate 49 defines the terminal means for making an electrical connection at the terminal 34. The end plate of the alternator forms the other terminal 32 as described in U.S. Pat. No. 5,043,614.

Figure 3:
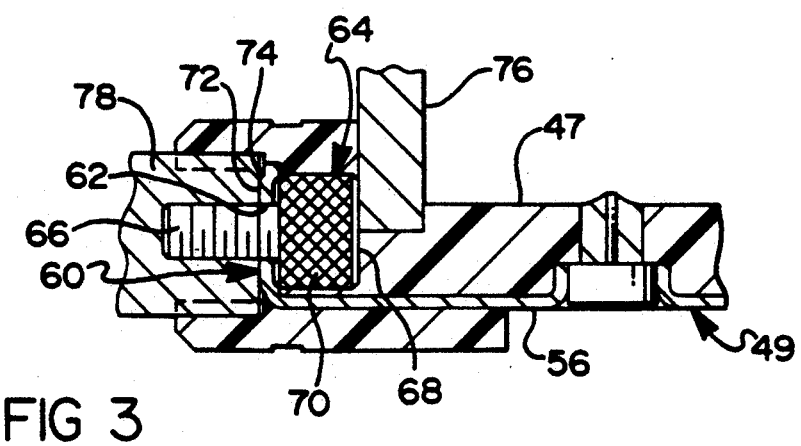
FIG. 3 is an enlarged sectional view of a portion of the alternator construction shown in FIG. 2.

As best shown in FIG. 3, the radiator plate 49 includes a connector plate 60, which has been bent for alignment perpendicular to a radially extending portion 56, and including an opening 62. The opening 62 receives the stem of a fastener such as the threaded stem 66 of the bolt 64. The bolt 64 has an enlarged head 68 with a knurled peripheral surface 70. The stem 66 is inserted through the opening 62 before the radiator plate 49 is inserted into a mold in accordance with the process discussed in U.S. Pat. No. 5,043,614.

The connecting plate 60 includes an axially extended portion 72 at the periphery of the opening 62 extending in the direction of the exposed stem 66. A tapered surface portion 74 lies adjacent the axially extended portion 72 to enable the plastic material flowing during the mold process to remain retracted from the contact surface 72 formed by the axially extended surface against which a terminal such as a harness eyelet may be pressed by a nut.

During the molding process, the bolt 64 may be inserted so that its head 68 is flush against the connecting plate 60 by means of the mold part 76. However, since the contact surface 72 is kept free of plastic material by the mold insert 78, the connecting plate directly engages the harness eyelet without using the bolt 64 as a conductor.

The plastic body is also shaped in the mold to form an axially extending, circumferentially interrupted wall around the connecting plate 60. As shown in FIG. 2, two interruptions provide a pair of walls that obstruct rotation of a harness eyelet installed over the bolt 64 as it is tightened against the contact surface 72 by a nut.

As a result, it will be understood that the present invention provides a means for securely attaching directly contacting conductive terminals such as harness eyelets to the rectifier output. Such terminals may be squeezed against the contact surface between the head of the bolt 64 and a nut. Such a connection avoids limited current carrying capacity of previously known spade connectors and avoids the loosening problems associated with the plastic sleeve supporting the previously known two nut clamping arrangement. In addition, the bolt is securely positioned in a fixed orientation by the plastic body surrounding the bolt, and the plastic body insulates the bolt from electrical contact with adjacent components. Moreover, the molded plastic joins with the knurled surface 70 on the enlarged head 68 to prevent rotation while a nut is being tightened on the stem. Furthermore, the coupling uses substantially fewer components than previously known bolt assemblies used as electrical connectors for alternators. Furthermore, the fastener need not be constructed as a conductor and a conventional bolt will not be relied upon as a conductor.

Having thus described the present invention, many modifications thereto will become apparent to those skilled in the art to which it pertains without departing from the scope and spirit of the present invention as defined in the appended claims.

I claim:

1. A rectifier bridge assembly with improved electrical terminal coupling for attachment to a polyphase alternator housing comprising:
   a plastic, circuit support member and a generally crescent-shaped radiator plate carried by said support member;
   a fastener forming the terminal coupling, having a stem and an enlarged head;
   said radiator plate having an extended connector plate having an opening dimensioned to receive said fastener stem; and
   a cavity in said support member receiving said enlarged fastener head adjacent said opening.

2. The invention as defined in claim 1 wherein said assembly is made by insert molding said support member around said radiator plate.

3. The invention as defined in claim 1 wherein said radiator plate is made by stamping.

4. The invention as defined in claim 1 wherein said connector plate includes an axially raised surface at the periphery of the opening.

5. The invention as defined in claim 4 wherein said connector plate includes a tapered surface extending radially outwardly from said raised surface.

6. The invention as defined in claim 1 wherein said support member includes a circumferentially interrupted, peripheral wall around the connector plate and extending axially from said connector plate.

7. The invention as defined in claim 5 wherein said support member includes a circumferentially interrupted, peripheral wall around the connector plate extending axially from said connector plate.

8. A method for assembling a rectifier bridge assembly for a poly-phase alternator, comprising:
   stamping a generally crescent-shaped radiator plate to include recesses adapted to receive diodes, heat transfer fins, and a connector plate with an opening, wherein the connector plate protrudes from an edge of said radiator plate;
   inserting said stamping in a mold; and
   filling said mold with a plastic material to form a support member about said radiator plate while obstructing the flow of molding material over a first surface of said connector plate and forming an axially extending, circumferentially interrupted wall about said connector plate.

9. The invention as defined in claim 8 wherein said stamping step includes forming radially extending portions, and further comprising bending said connector plate perpendicular to said radially extending portion.

10. The invention as defined in claim 8 wherein said connector plate is shaped as a ring.

11. The invention as defined in claim 8 wherein said method includes forming an axially raised surface at the periphery of the opening on said connector plate before said inserting step.

12. The invention as defined in claim 11 wherein said forming step further comprises tapering the connector plate surface adjacent said axially raised surface before said inserting step.

13. The invention as defined in claim 9 wherein said bending step precedes said inserting step and further comprising inserting a fastener in said opening before said filling step.

14. The invention as defined in claim 13 and further comprising displacing a mold insert against said fastener before said filling step.

15. The invention as defined in claim 12 and further comprising displacing a mold wall insert against said axially raised surface.

16. A rectifier bridge assembly for a polyphase alternator with stator windings in a housing, said bridge assembly comprising:
   a generally crescent-shaped plastic circuit member formed to be received by and secured to the housing, said plastic circuit member having an electrically conductive radiator plate and a plurality of conductor members embedded therein and electrically insulated from one another thereby;

said radiator plate having a plurality of apertures formed in radially extending portions thereof for receiving a like plurality of diodes;

a plurality of diodes each having a first electrode and an opposite second electrode, apertures in a portion of the housing receiving like electrodes and said apertures of said radiator plate all receiving like opposite electrodes;

means for securing said plastic circuit member to said housing portion; and conductor members connecting electrodes of pairs of said diodes associated with the stator windings of the alternator after securing said plastic circuit member to said alternator housing portion, wherein said radiator plate defines a first output of said alternator and said alternator housing portion defines a second output of said alternator, wherein said first output comprises an apertured connecting plate carrying a fastener.

17. The invention as defined in claim 16 wherein said plastic circuit member comprises an axially extending, circumferentially interrupted wall around said connecting plate.

18. The invention as defined in claim 16 wherein said connecting plate includes an axially raised portion at the periphery of the aperture.

* * * * *